(12) United States Patent
Grimm et al.

(10) Patent No.: US 7,182,400 B2
(45) Date of Patent: Feb. 27, 2007

(54) SLIDING ROOF SYSTEM

(75) Inventors: Rainer Grimm, Frankfurt (DE); Thomas Becher, Rodgau (DE); Joachim Roeder, Muehlheim (DE); Horst Boehm, Frankfurt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 11/074,405

(22) Filed: Mar. 8, 2005

(65) Prior Publication Data

US 2005/0200165 A1  Sep. 15, 2005

(30) Foreign Application Priority Data

Mar. 15, 2004  (DE) ............... 10 2004 012 525

(51) Int. Cl.
B60J 7/057 (2006.01)

(52) U.S. Cl. .................. 296/216.08; 296/223

(58) Field of Classification Search ........... 296/216.03, 296/216.05, 216.08, 223

See application file for complete search history.

(56) References Cited

U.S. PATENT DOCUMENTS

| | | | | |
|---|---|---|---|---|
| 4,995,667 A | * | 2/1991 | Tamura et al. | 296/216.03 |
| 5,344,209 A | * | 9/1994 | Regner | 296/223 |
| 6,619,732 B2 | * | 9/2003 | Radmanic | 296/216.03 |
| 6,916,064 B2 | * | 7/2005 | Bohm et al. | 296/216.04 |
| 6,942,286 B2 | * | 9/2005 | Bohm et al. | 296/216.05 |

FOREIGN PATENT DOCUMENTS

| | | | |
|---|---|---|---|
| DE | 4306451 | * | 3/1993 |
| DE | 10002457 | * | 3/2001 |
| EP | 1180445 | * | 8/2001 |

* cited by examiner

Primary Examiner—Dennis H. Pedder
(74) Attorney, Agent, or Firm—Carlson, Gaskey, & Olds

(57) ABSTRACT

A sliding roof system includes at least one cover, two guide rails, and first and second carriages that are movable in the two guide rails. The sliding roof system also includes first and second holding parts that are each coupled with one of the first and second carriages and that are each coupled with a rear edge of the cover. The first and second holding parts can be shifted between a first position in which there is a first clearance between the first and second holding parts, and a second position in which there is a second clearance between the first and second holding parts that is larger than the first clearance.

19 Claims, 9 Drawing Sheets

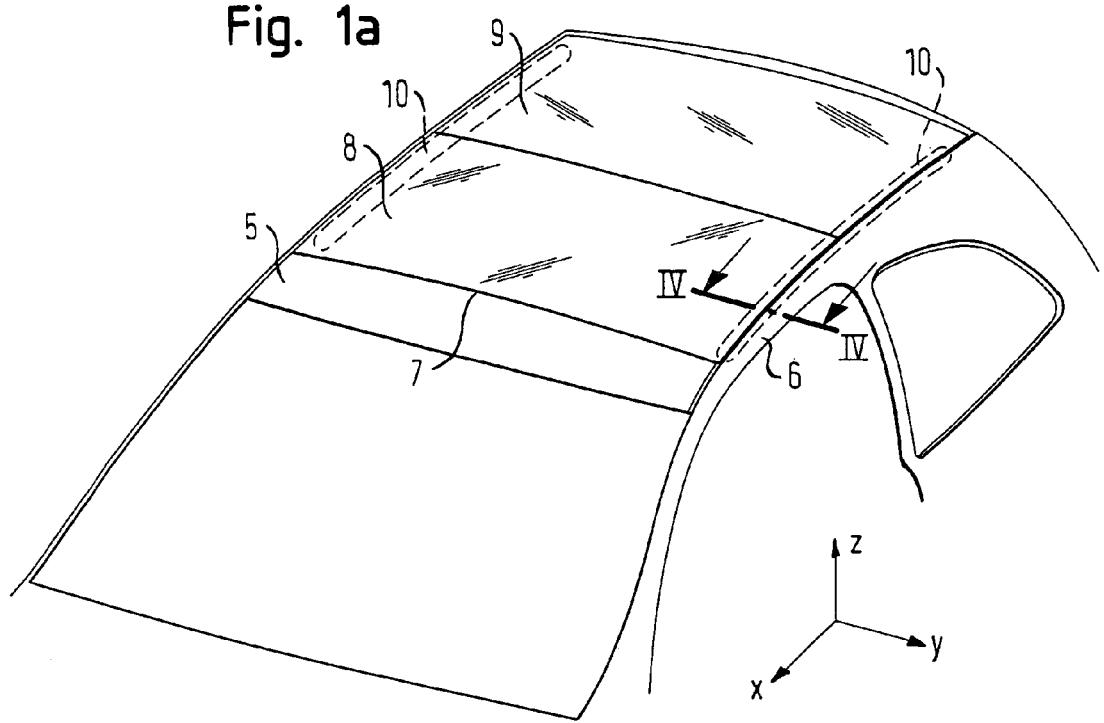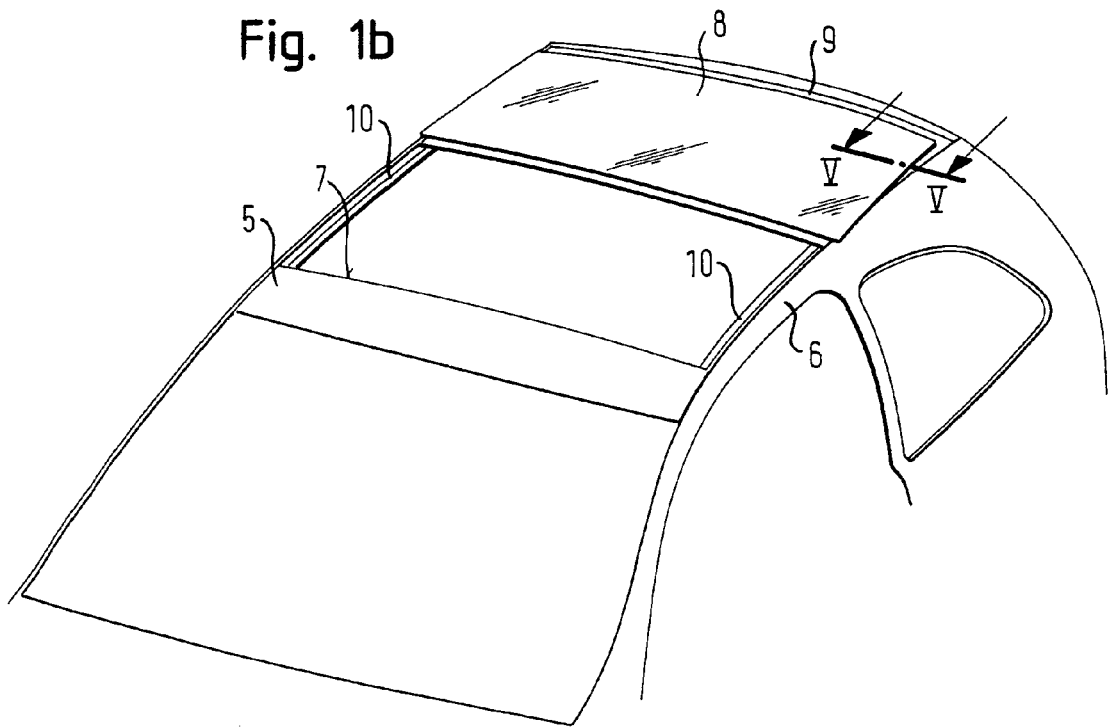

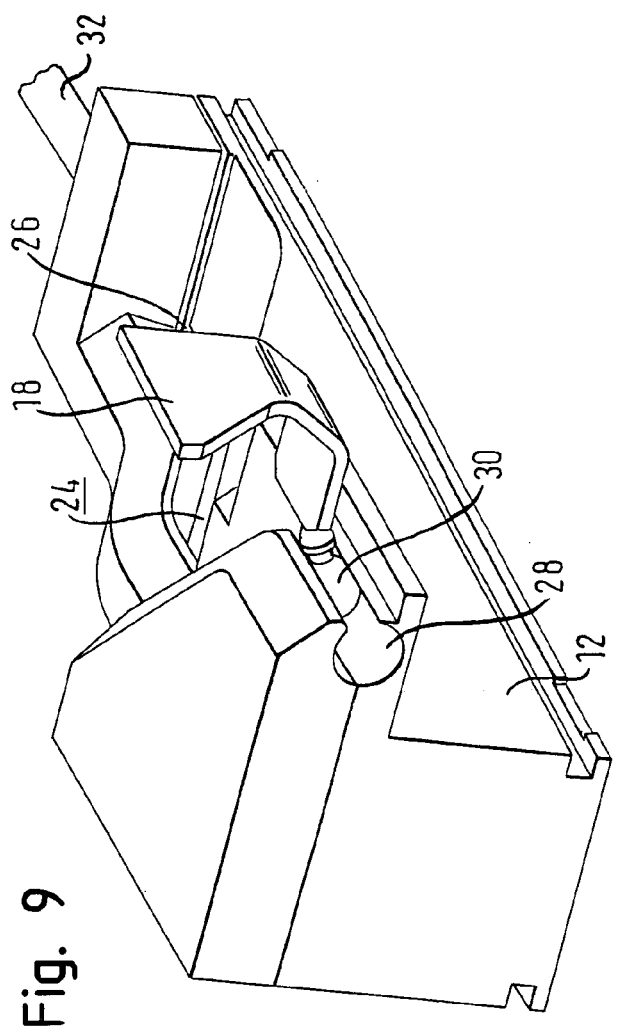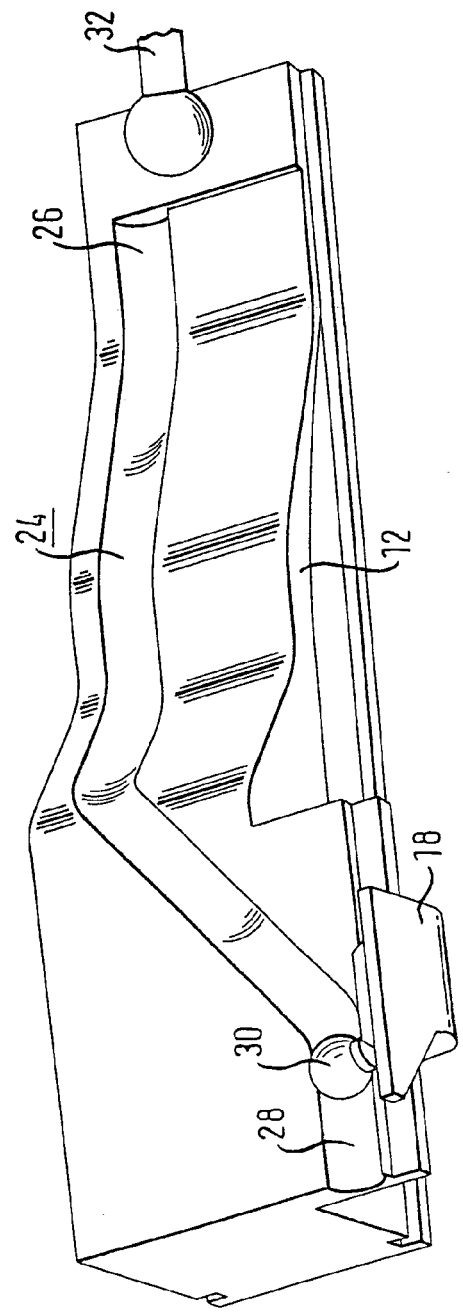

SLIDING ROOF SYSTEM

BACKGROUND OF THE INVENTION

The application claims priority to German Application No. 10 2004 012 525.2, which was filed on Mar. 15, 2004.

The invention relates to a sliding roof system that includes at least one cover, two guide rails, and first and second carriages that are movable in the guide rails. The sliding roof system also includes first and second holding parts that each are coupled with one carriage and a rear edge of the cover.

In conventional sliding roof systems, by moving the first and second carriages in the guide rails, the cover can first be lifted or lowered at a rear edge, and can then be moved as a whole. As long as there is only one cover that is to be shifted to the rear, so as to lie higher than a roof skin, the required lifting movement of the cover can be easily provided by known guide mechanisms.

Recently, however, sliding roof systems have utilized two covers, one lying behind the other, instead of a single cover. These sliding roof systems include a first cover that can be shifted in order to expose a roof opening, and a second cover that is stationary. Both the first and second covers consist of a transparent material so that a very large transparent roof area is produced as a whole. For visual reasons it would be desirable to configure the first and second covers to be identical. At a minimum, it would be desired that the first and second covers have the same width, at least in the region of adjoining edges. Moreover, the first and second covers should have as wide a configuration as possible. With the known guide mechanisms, however, it is not possible to shift the first cover above an external surface of the second cover. The guide mechanism mounted underneath the first cover has a slightly smaller width than the first cover and, accordingly has a slightly smaller width than a front edge of the first cover. For this reason the second cover has been traditionally configured to have a smaller width than the first cover, so that the guide mechanism of the first cover can laterally run past the edges of the second cover.

It is the object of the invention to provide a sliding roof system with which a cover can be moved even if the cover is to be shifted over another component that has the same width as the cover.

SUMMARY OF THE INVENTION

A sliding roof system includes at least one cover, two guide rails, and first and second carriages that are movable in the two guide rails. The subject invention also provides the sliding roof system with first and second holding parts that are shiftable between a first position defining a first clearance between the first and second holding parts, and a second position defining a second clearance between the first and second holding parts, which is larger than the first clearance. The subject invention shifts a connection that is provided between the first and second carriages and the cover, and which is disposed in a region of a rear edge of the cover, as a function of a respective position of the connection in the two guide rails.

As long as the rear edge of a first cover is not above a second cover, the first and second holding parts can be in the first position in which the first and second holding parts are separated by a comparably small mutual distance. A maximum mutual distance between the first and second holding parts is smaller than a width of a roof opening in this region so that an entire guide mechanism for the first cover is received underneath the first cover, so as to be not visible. If the rear edge of the first cover is to be moved over a front edge of the second cover, the first and second holding parts are made to assume the second position in which there is a clearance between the first and second holding parts that is larger than a width of the second cover. Thus, the first and second holding parts can be moved rearwardly at the side of the second cover.

According to a preferred embodiment of the subject invention, provision is made that the two guide rails have first and second portions. A mutual distance separating the second portions of the two guide rails is larger than a mutual distance separating the first portions. In this embodiment, the first and second carriages, together with the first and second holding parts, are immediately shifted outwardly so that the first and second carriages and the first and second holding parts can be moved rearwardly at the side of the second cover.

According to a second preferred embodiment of the subject invention, provision is made that each of the first and second carriages has a guiding slot comprising first and second portions. A mutual distance separating the second portions of the guiding slots is larger than a mutual distance separating the first portions. In this embodiment, the first and second holding parts within the two guide rails are each moved from an inside position to an outside position in order to provide a larger distance between the first and second holding parts.

According to a third preferred embodiment of the subject invention, provision is made that the first and second holding parts, in order to move from the first position to the second position, are rotated about a bearing axis. It is not required in this embodiment to move all of the first and second holding parts between the first and second carriages and the cover outwardly; it is merely necessary to rotate the first and second holding parts in an appropriate manner.

These and other features of the present invention can be best understood from the following specification and drawings, the following of which is a brief description.

BRIEF DESCRIPTION OF THE DRAWINGS

FIG. 1a shows a schematic, perspective view of a vehicle roof including a sliding roof system according to the subject invention in a closed position.

FIG. 1b is a view similar to FIG. 1a but showing the sliding roof system in an open position.

FIG. 9 shows, in a perspective view, a carriage for the sliding roof system of FIG. 7.

FIG. 10 shows the carriage of FIG. 9 in a sectioned view.

DETAILED DESCRIPTION OF THE PREFERRED EMBODIMENT

Figure 2:
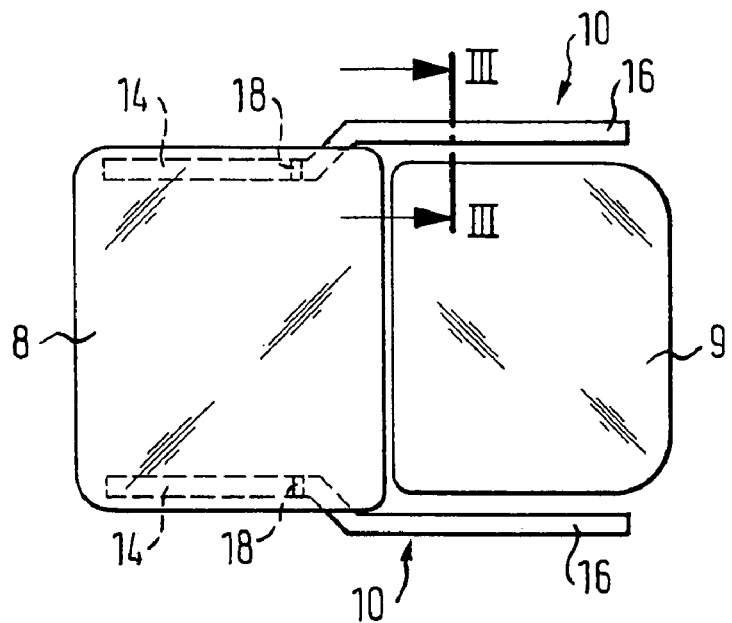
FIG. 2 shows a schematic top view of a sliding roof system according to a first embodiment.

FIGS. 1a and 1b show a vehicle roof 5 with a roof opening 7. Arranged in the roof opening 7 is a first cover 8 and a second cover 9. The first and second covers 8, 9 are formed of a transparent material. The second cover 9 is fixedly mounted to the vehicle roof 5. From a position shown in FIG. 1a, where the first cover 8 closes the roof opening 7, the first cover 8 can be shifted outwardly and rearwardly so that the first cover 8 lies above the second cover 9 (see FIG. 1b).

It should be understood that terms such as "top," "bottom," "front," "rear," "outwardly," "inwardly," "forwardly," "rearwardly," etc., are used only for descriptive purposes. Reference is further made to a common system of coordinates of a vehicle. That is, "front" corresponds to the x-direction and "top" to the z-direction.

The first cover 8 moves along two guide rails 10 between a closed position and an open position. The guide rails 10 are fixedly mounted to longitudinal spars 6 that represent a transition to the vehicle roof 5. The guide rails can be made of plastics, an aluminum alloy, or other suitable material.

At least one carriage is movably mounted in either of the guide rails 10. Such carriage can be shifted by a drive motor through a cable, for instance. One or more carriages together with guiding slots or lifting slots, ensures that the first cover 8 can be shifted in a desired way along a longitudinal vehicle direction from front to rear, as well as with front and rear edges to the top and to the bottom, respectively. For the comprehension of the present invention, it is important to understand in which way the rear edge of the first cover 8 is held and shifted. Therefore, only the rear carriage, identified by reference numeral 12, is dealt with in the Figures. Here it is to be taken into account that the carriage 12 either can be part of a single, larger carriage through which the front edge of the cover 8 is shifted, or can be connected with a front carriage.

Figure 3:
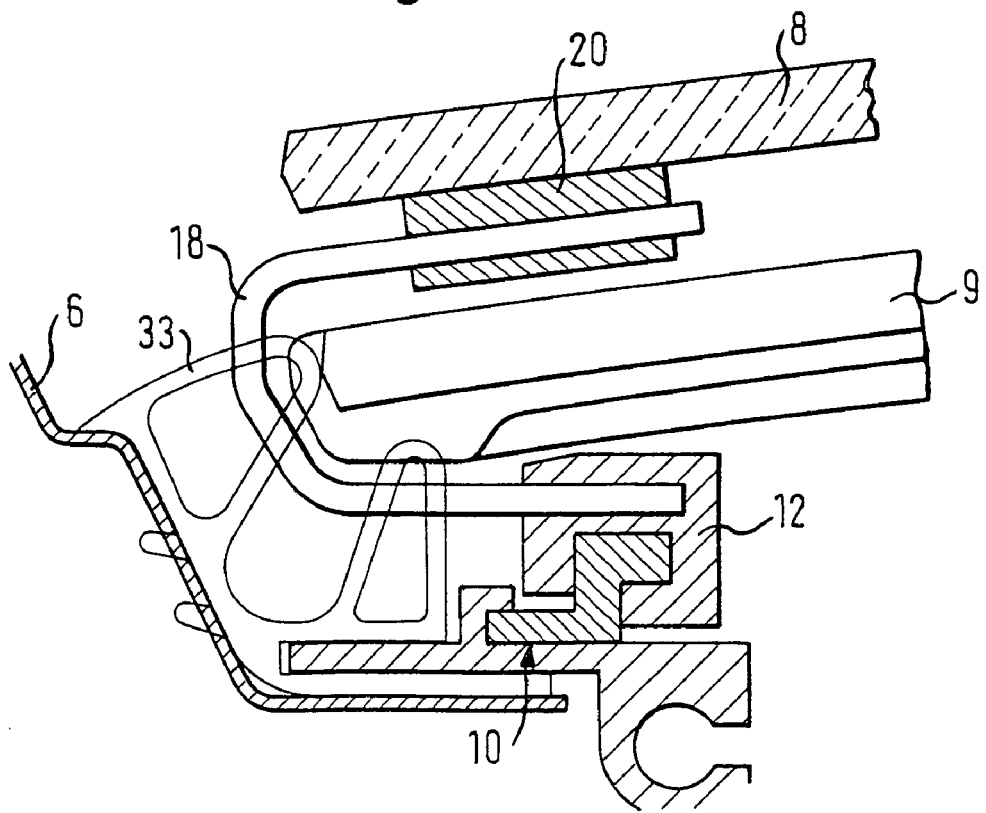
FIG. 3 shows, in a schematic section along plane III—III of FIG. 2, the sliding roof system according to the first embodiment, with a first cover having been opened.

In FIGS. 2 and 3 there is shown a sliding roof system according to a first embodiment. Each of the two guide rails 10 has a first portion 14 in a region taken up by the first cover 8 when in the closed position. Adjoining the first portion 14 is a second portion 16, which in each case lies outside the second cover 9. In FIG. 2, it can be seen that the first portions 14 of the two guide rails 10 have a mutual distance that is smaller than a width of the first cover 8, and that the second portions 16 have a mutual distance that is larger than the mutual distance separating the first portions 14 and is also larger than a width of the second cover 9 (and also of the first cover 8). Although not visible in FIG. 2, the second portions 16 are at a level that is higher than the level of the first portions 14. Between the first and second portions 14, 16 there is a transition section in which each guide rail 10 extends obliquely towards the top and outside.

Arranged on each guide rail 10 is a carriage 12 in which a holding part 18 is mounted. The holding part 18 has a C-shaped curvature, with a convex portion being oriented outwardly. This provides a free interior space. Each holding part 18 is attached to the first cover 8 by means of a guide 20 in which the holding part 18 is movably supported. The guide 20 allows the holding part 18 to move transverse to a longitudinal direction defined by the guide rails 10, i.e., approximately parallel to a y direction.

When the first cover 8 is in the closed position, each holding part 18 is in a first position underneath the first cover 8 where its farthest outer edge lies within an outline of the first cover 8. When the first cover S is shifted rearwardly and over the second cover 9, the carriage 12 slides from the first portion 14 of the guide rail 10 to the second portion 16. In this process, the holding part 18 is shifted to the top and outwardly to a second position, whereby a clearance between the two convex portions of the holding parts 18 increases to a value that is larger than the width of the second cover 9. This allows the holding parts 18 to encompass a periphery of the second cover 9 and to hold the first cover 8 above the second cover 9 (see FIG. 3).

Figure 4:
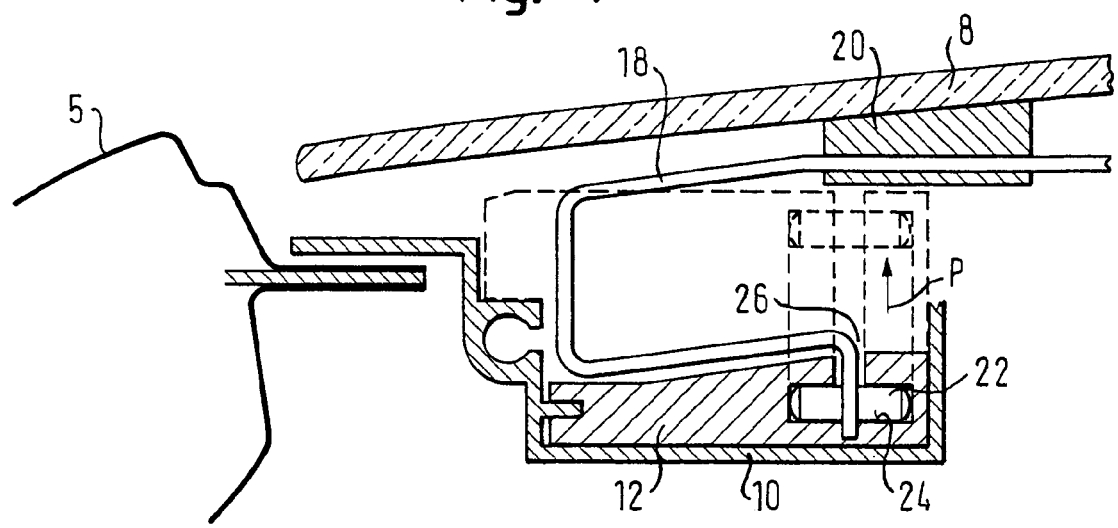
FIG. 4 shows, in a schematic section along plane IV—IV of FIG. 1a, a sliding roof system according to a second embodiment, with the first cover being in a closed position.
Figure 5:
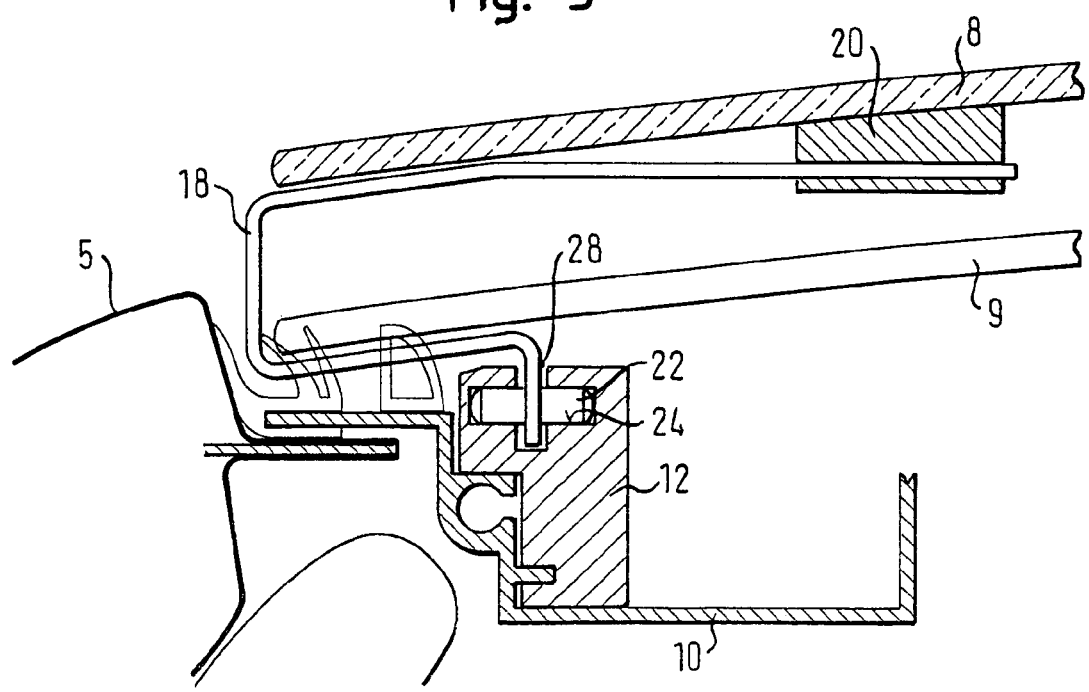
FIG. 5 shows a schematic view along plane V—V of FIG. 1b, with the first cover being in an open position.

FIGS. 4 and 5 show a sliding roof system according to a second embodiment. In contrast to the first embodiment, the shifting movement of the holding parts 18 from the first position in which they lie underneath the first cover 8, to the second position in which they laterally circumscribe the second cover 9, is produced in an interior of the carriage 12. The guide rail 10 runs approximately in a straight line along the x-axis of the vehicle.

In the second embodiment, the holding part 18 is provided with a transverse pin 22 that is guided in a guiding slot 24 in the carriage 12. The guiding slot 24 has a first portion 26 seen in FIG. 4, and a second portion 28 seen in FIG. 5. The second portion 28 of the guiding slot 24 lies farther outwards than the first portion 26, so that a distance between the guiding slots 24 is larger in the second portion 28 than in the first portion 26.

When the first cover 8 is in the closed position (see FIG. 4), the transverse pin 22 of the holding part 18 is in the first portion 26 of the guiding slot 24 so that the holding part 18 lies completely underneath the first cover 8 in the first position. When the first cover 8 is transferred to the open position, the transverse pin 22 slides in the guiding slot 24 to the top (see arrow P in FIG. 4) and subsequently moves outwardly into the second portion 28 whereby the holding part 18 is shifted to the top and outwardly into the second position. This allows passage around outer edges of the second cover 9 (see FIG. 5) and allows the first cover 8 to be guided above the second cover 9.

Figure 6:
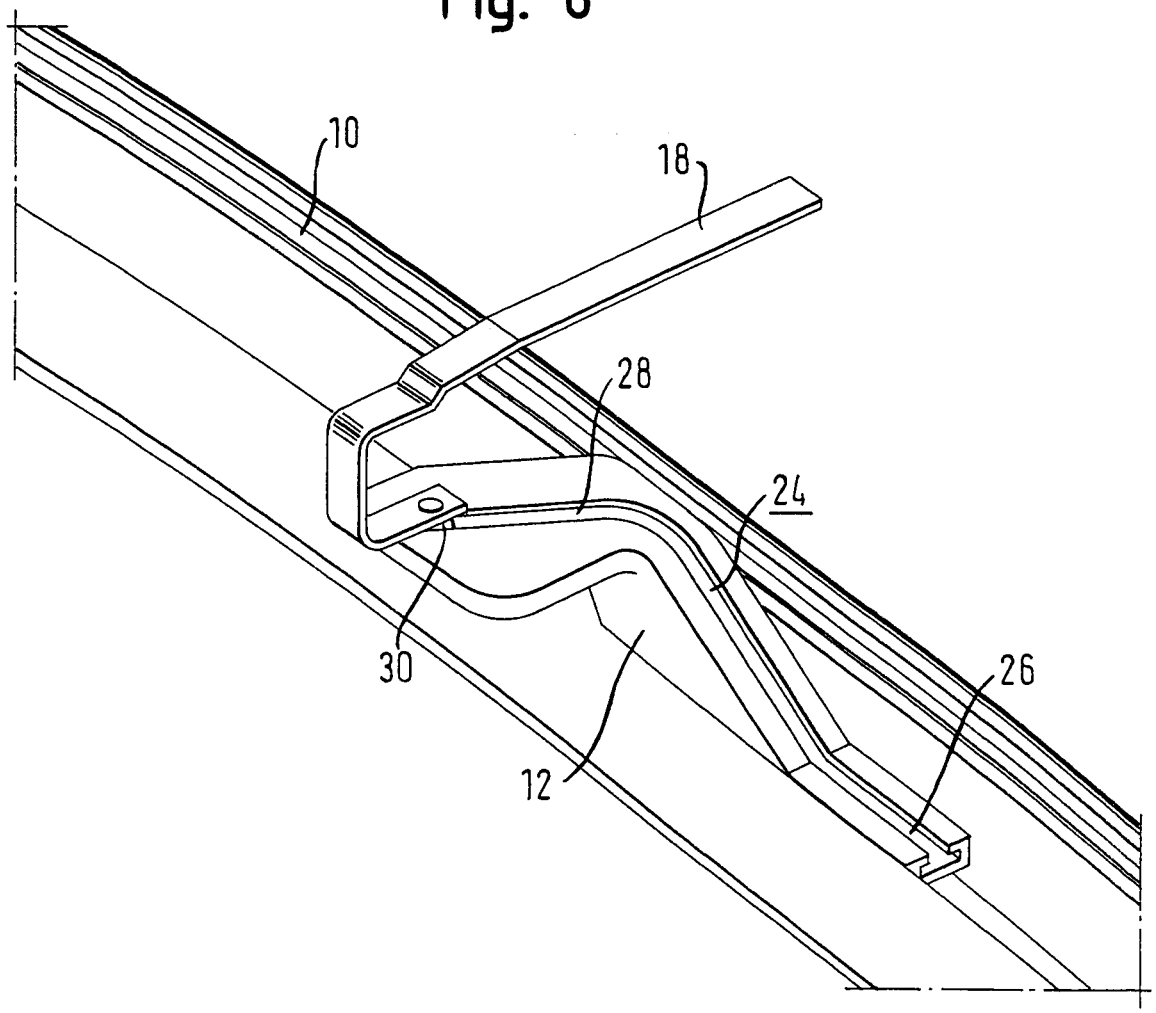
FIG. 6 shows in a perspective, broken view, a carriage for a design variant of a sliding roof system according to the second embodiment.
Figure 7:
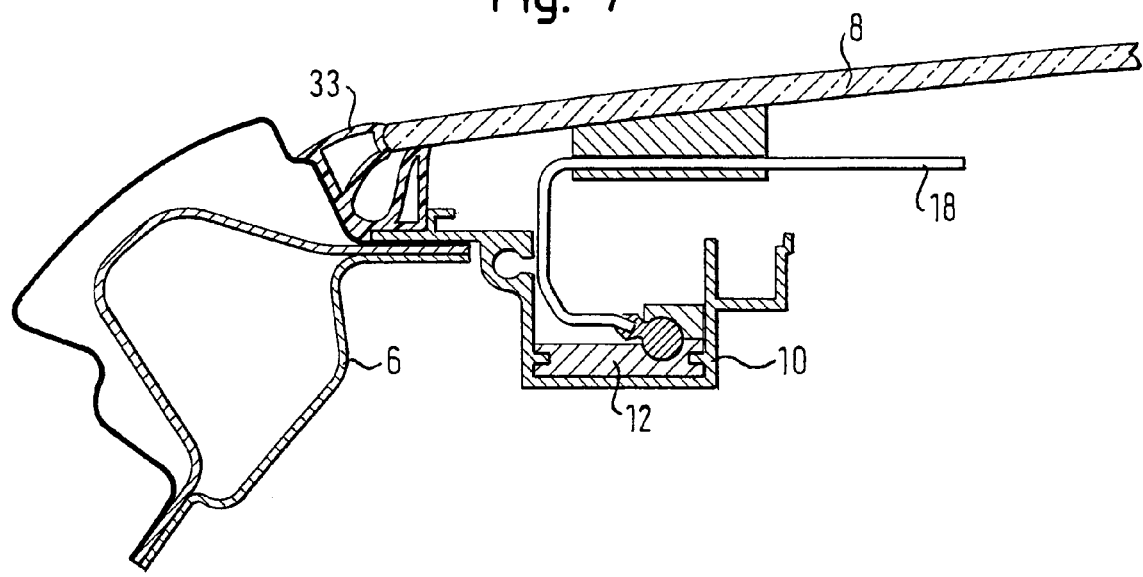
FIG. 7 shows in a view corresponding to that of FIG. 4, a section through a second design variant of a sliding roof system according to the second embodiment.

FIG. 6 shows a design variant of the second embodiment. In contrast to the variant shown in FIGS. 4 and 5, the holding part 18 is not provided with a transverse pin 22, but instead has a ball-shaped head 30. The ball-shaped head 30 guides the holding part 18 from the first portion 26, via a transition portion extending obliquely to the top, to the second portion 28 that runs obliquely outside. At the end of the second portion 28 of the guiding slot 24, the holding part 18 is shifted outwardly to the second position so that the holding part 18 can pass the second cover 9 along outer longitudinal edges of the second cover 9.

FIGS. 7 to 10 show a sliding roof system according to another design variant. In contrast to the design variant of FIG. 6 where the guiding slot 24 is open towards the top, the guiding slot 24 in the design variant of FIGS. 7 to 10 is open in a lateral direction facing outwardly. Additionally, a connecting element 32 connects the carriage 12 with a front carriage (not illustrated) to guide a front edge of the first cover 8.

Figure 8:
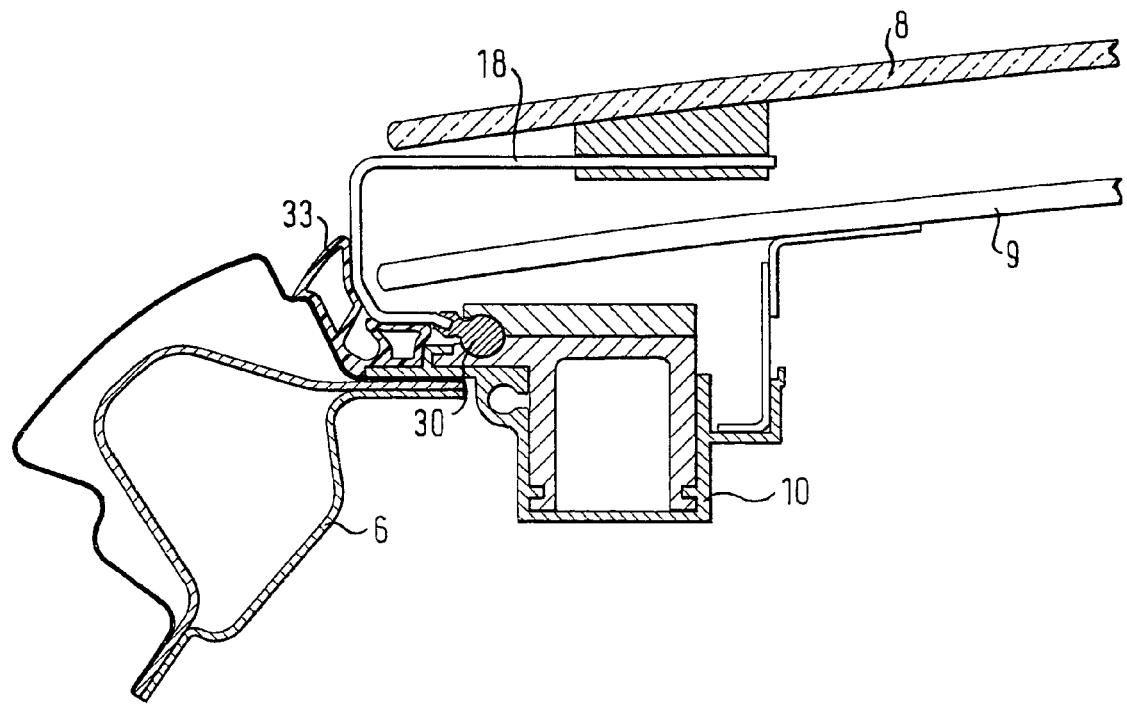
FIG. 8 shows the sliding roof system of FIG. 7, with the first cover being in the open position.

FIG. 8 clearly shows how the holding part 18 moves along between the second cover 9 and the longitudinal spar 6. A seal 33 seals between the second cover 9 and the longitudinal spar 6. The seal 33 is pushed is pushed or compressed to the side as the holding part 18 moves.

Figure 11:
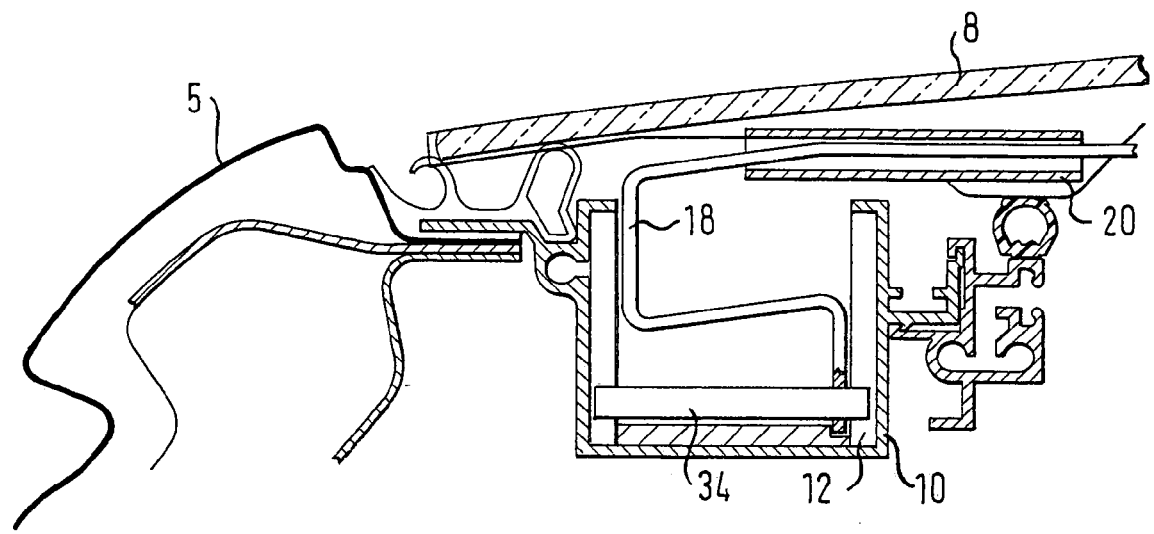
FIG. 11 shows, in a view corresponding to that of FIG. 4, a third design variant of a sliding roof system according to the second embodiment.
Figure 12:
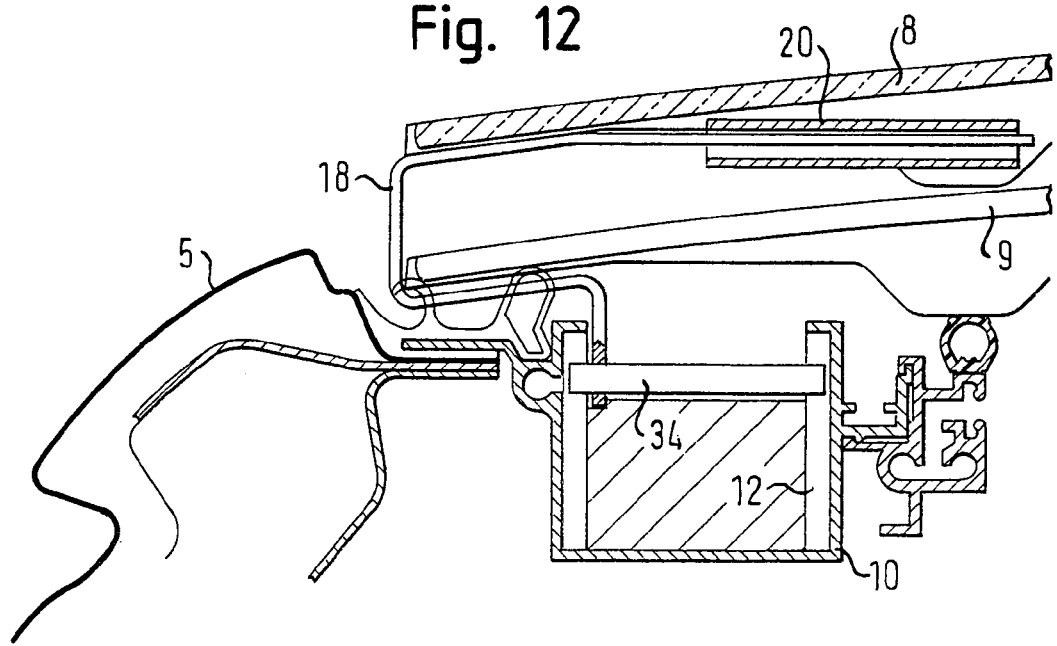
FIG. 12 shows the sliding roof system of FIG. 11 in a view corresponding to that of FIG. 5.
Figure 14:
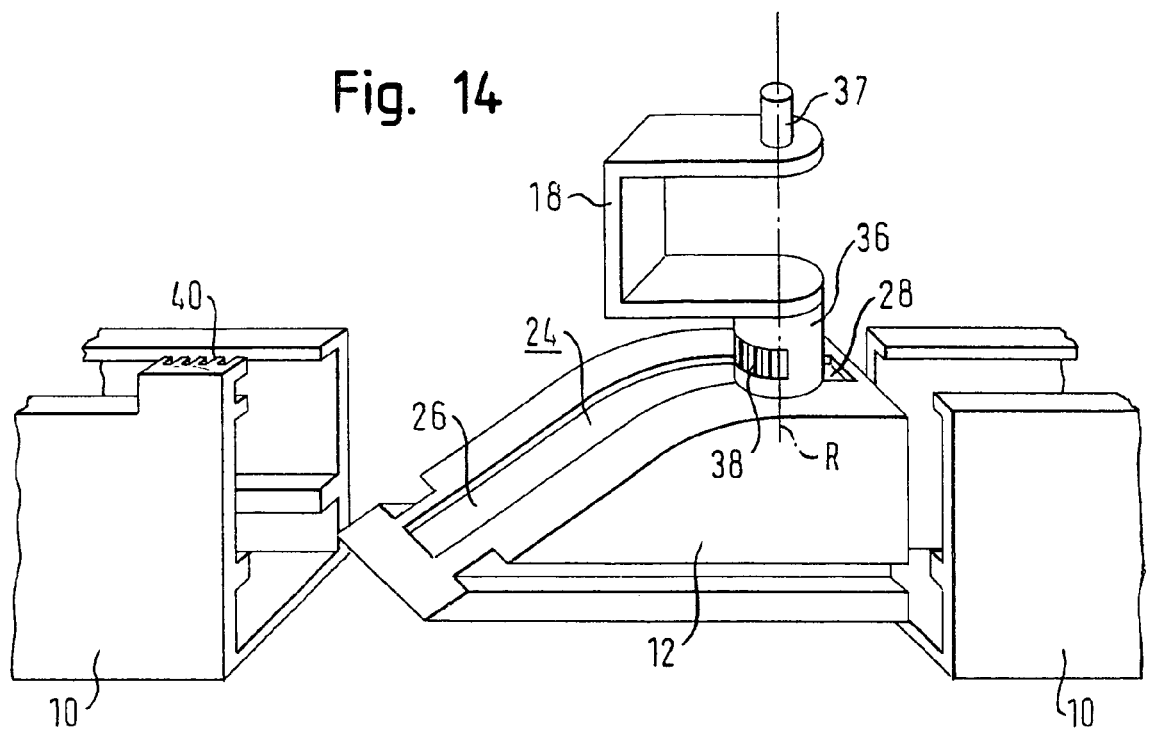
FIG. 14 shows a perspective view of the carriage of the sliding roof system according to the third embodiment.
Figure 13:
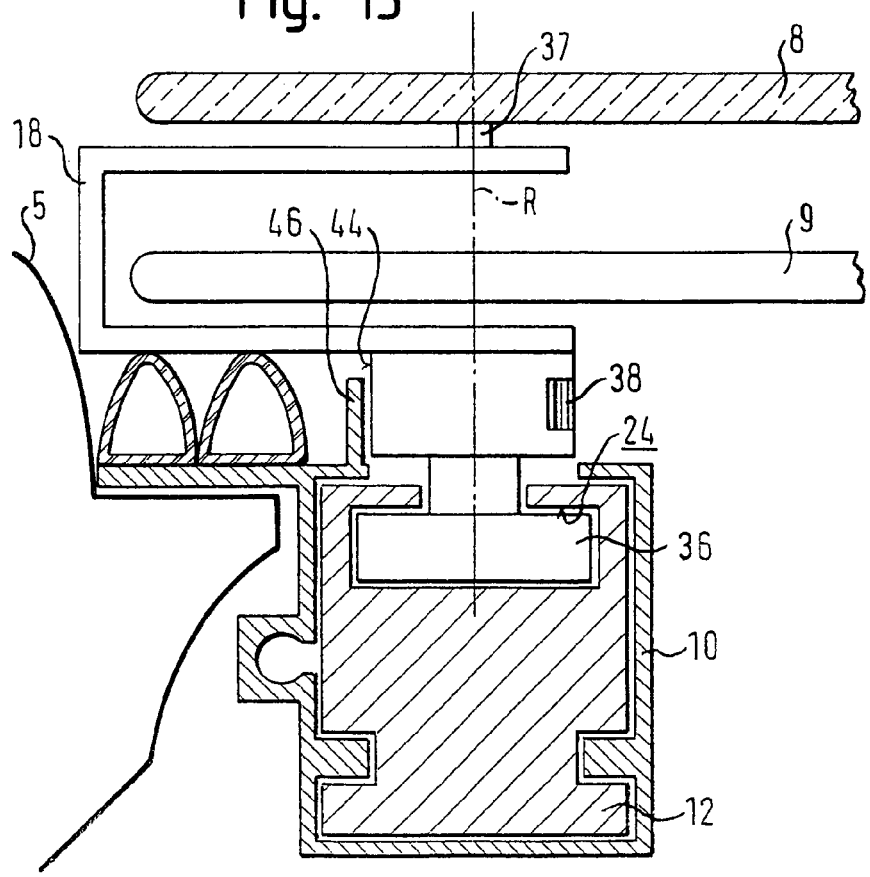
FIG. 13 schematically shows a sliding roof system according to a third embodiment in a section along plane V—V of FIG. 1b, with the first cover being in the open position.
Figure 15:
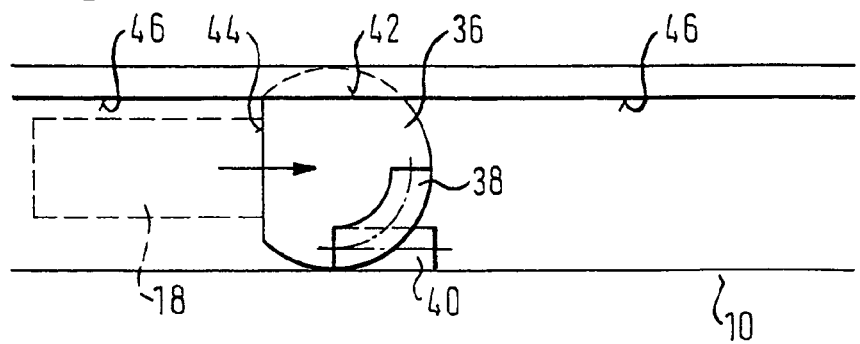
FIG. 15 schematically shows a holding part of the sliding roof system of FIG. 13 in a first position.
Figure 16:
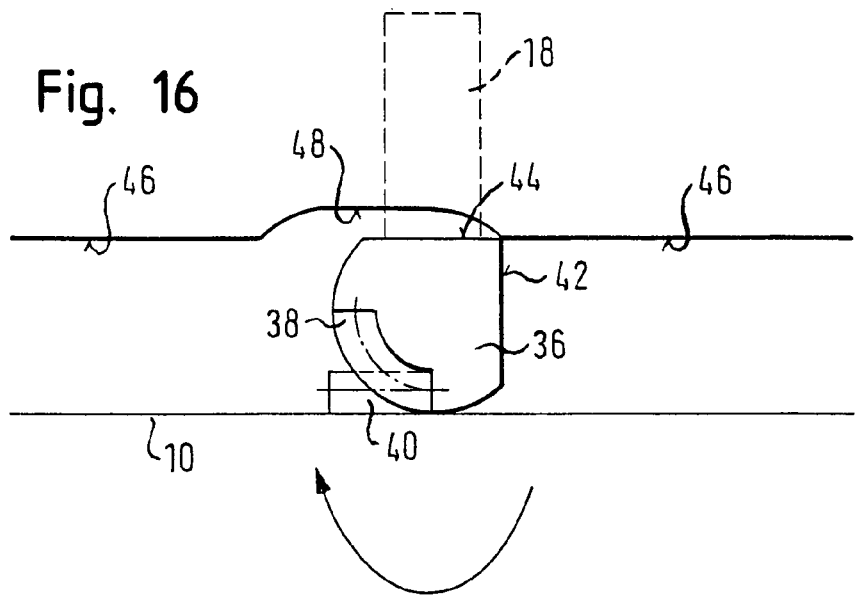
FIG. 16 schematically shows a transferring of the holding part from the first to a second position.
Figure 17:
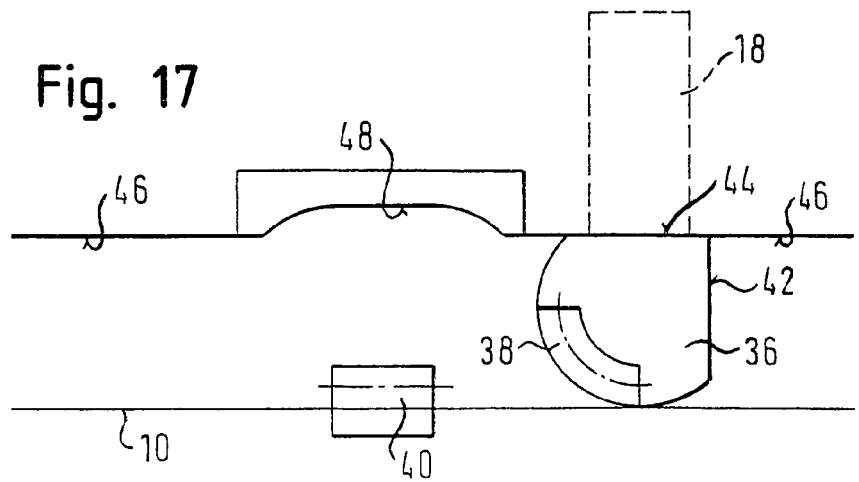
FIG. 17 schematically shows the holding part of the sliding roof system of FIG. 13 in the second position.

FIGS. 11 and 12 show another design variant. This differs from the design variant shown in FIGS. 4 and 5 in that the holding part 18 is movably supported on a cross bolt 34 that is supported in a guiding slot in the carriage 12 for movement in a vertical direction. Hence, the shifting of the holding part 18 from the first position to the top, and outwardly into the second position, is accomplished by the cross bolt 34 transferring from a lower position (see FIG. 11) to an upper position (see FIG. 12) during shifting of the carriage 12 in the guide rail 10. At the same time, the holding part 18 on the cross bolt 34 is transferred from an inner position (see FIG. 11) to an outer position (see FIG. 12).

In a first position (see FIG. 11), the holding part 18 lies underneath the first cover 8 and also within the guide rail 10. In a second position (see FIG. 12), the holding part 18 is shifted outwardly so the holding part 18 can encompass a periphery of the second cover 9 and guide the first cover 8 above the second cover 9. As can be seen from a comparison of FIGS. 11 and 12, the holding part 18 is moved outwardly in the guide 20.

In FIGS. 13 to 17 there is shown a third embodiment of the sliding roof system. In this embodiment the carriage 12 is provided with a guiding slot 24 that extends parallel to the longitudinal direction of the guide rail 10, and runs from a first portion 26 upwards to a second portion 28. The holding part 18 is received in the guide rail 10 and engages in the guiding slot 24 with a gliding piece 36 that can be rotated in the guiding slot 24. The holding part 18 is supported on the first cover 8 with a pivot pin 37. An axis of rotation R of the pivot pin 37 is coincident with an axis of rotation of the gliding piece 36 in the guiding slot 24. The gliding piece 36 includes a gear segment 38, and the guide rail 10 includes a plurality of teeth 40 that engage the gear segment 38. The plurality of teeth 40 extend along a length of the guide rail 10. This length is selected such that it corresponds to a quarter of a revolution of the gliding piece 36. The gliding piece 36 is also provided with first and second arresting faces 42, 44 that are perpendicular to each other and are adapted to counteract with a mating face 46 on the guide rail 10.

When the holding part 18 is in a first position (see FIGS. 14 and 15), the "convexity" of the holding part 18 is oriented to the front or to the rear. As can be seen in particular in FIG. 15, the holding part 18 thus lies above the guide rail 10 when viewed from above, and hence within the side edges of the first cover 8. In this position, the first arresting face 42 rests at the mating face 46 of the guide rail 10. When the first cover 8 is shifted to the rear, the gear segment 38 on the gliding piece 36 comes into contact with the plurality of teeth 40 on the guide rail 10. This forces the gliding piece 36 to perform a clockwise revolution with regard to FIG. 15, by a quarter of one revolution, if it is further pushed to the rear (to the right with respect to the FIGS. 15 and 16). Thereby the convexity of the holding part 18 is swiveled outwardly (see FIG. 16) so that the holding part 18 can pass the longitudinal edges of the second cover 9. The rotation of the gliding piece 36 by 90° is made possible by a recess 48 in the mating face 46. When the gear segment 38 has exited the plurality of teeth 40, the gliding piece 36 will again be arrested by the mating face 46, and this time in the second position (see FIG. 17).

According to a further development of the invention (not illustrated), it is also possible to provide shiftable holding parts on the front edge of the first cover 8, too. This allows the first cover 8 to move even farther towards the rear, in fact such that the first cover 8 lies in its entirety above the second cover 9.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding roof system comprising:
   a stationary cover;
   a movable cover that moves relative to the stationary cover;
   two guide rails to extend in a longitudinal direction along edges of a roof opening;
   first and second carriages that are movable in the two guide rails wherein the movable cover is associated with the first and second carriages; and
   first and second holding parts wherein each of the first and second holding parts is coupled with one of the first and second carriages and with a rearward portion of the movable cover, and wherein the first and second holding parts are shiftable between a first position in which there is a first clearance between the first and second holding parts, and a second position in which there is a second clearance between the first and second holding parts that is larger than the first clearance.

2. The sliding roof system according to claim 1 wherein the stationary cover is located behind the movable cover when the first and second holding parts are in the first position, and wherein the second clearance between the first and second holding parts is larger than a width of the stationary cover.

3. The sliding roof system according to claim 1 wherein the first and second holding parts, when moving from the first position to the second position, are essentially moved away from each other transverse to the longitudinal direction defined by the two guide rails.

4. The sliding roof system according to claim 3 wherein the two guide rails each have first and second portions with a distance separating the second portions being greater than a distance separating the first portions.

5. The sliding roof system according to claim 3 wherein each of the first and second carriages has a guiding slot comprising first and second portions with a distance separating the second portions being greater than a distance separating the first portions.

6. The sliding roof system according to claim 5 wherein the guiding slot is open towards a top.

7. The sliding roof system according to claim 5 wherein the guiding slot is open in a lateral direction.

8. The sliding roof system according to claim 5 wherein the first and second holding parts have a ball-shaped head in engagement with the guiding slot.

9. The sliding roof system according to claim 5 wherein the first and second holding parts have a first portion extending in a first direction and a transverse pin in engagement with the guiding slot, the transverse pin extending in a second direction transverse to the first direction.

10. The sliding roof system according to claim 5 wherein the first and second holding parts are supported on a cross bolt for movement in a transverse direction, and wherein the cross bolt is shiftable in the first and second carriages in a vertical direction.

11. The sliding roof system according to claim 1 wherein the first and second holding parts are supported on the movable cover in a guide that allows transverse movement relative to the longitudinal direction defined by the two guide rails.

12. The sliding roof system according to claim 1 wherein the first and second holding parts, when moving from the first position to the second position, are rotated about a bearing axis.

13. The sliding roof system according to claim 12 wherein the first and second holding parts are rotatably supported on the first and second carriages and the movable cover.

14. The sliding roof system according to claim 12 wherein the first and second holding parts are supported on the first and second carriages in a guiding slot that is adapted to shift the first and second holding parts in a vertical direction.

15. A sliding roof system comprising:
at least one cover;
two guide rails, wherein teeth are provided on the two guide rails;
first and second carriages that are movable in the two guide rails;
first and second holding parts wherein each of the first and second holding parts is coupled with one of the first and second carriages and with a rearward portion of the at least one cover, and wherein the first and second holding parts are shiftable between a first position in which there is a first clearance between the first and second holding parts, and a second position in which there is a second clearance between the first and second holding parts that is larger than the first clearance; and
the first and second holding parts, when moving from the first position to the second position, are rotated about a bearing axis and wherein the first and second holding parts are rotated from the first position into the second position by the teeth.

16. A sliding roof system comprising:
at least one cover
two guide rails;
first and second carriages that are movable in the two guide rails; and
first and second holding parts wherein each of the first and second holding parts is coupled with one of the first and second carriages and with a rearward portion of the at least one cover, and wherein the first and second holding parts are shiftable between a first position in which there is a first clearance between the first and second holding parts, and a second position in which there is a second clearance between the first and second holding parts that is larger than the first clearance, wherein the first and second holding parts, when moving from the first position to the second position, are rotated about a bearing axis, and wherein the first and second holding parts are provided with two arresting faces that arrest the first and second holding parts in the first or second position by resting against the two guide rails.

17. The sliding roof system according to claim 1 wherein the stationary and movable covers are formed of a transparent material.

18. The sliding roof system according to claim 1 wherein the first and second holding parts are mounted for movement relative to the moveable cover by a guide.

19. The sliding roof system according to claim 18 wherein the movable cover moves generally in the longitudinal direction from a closed position to an open position and wherein the first and second holding parts are shiftable in a direction transverse to the longitudinal direction when the first and second holding parts are moved between the first and second positions.

* * * * *